(12) United States Patent
Nakao

US006856866B2

(10) Patent No.: US 6,856,866 B2
(45) Date of Patent: Feb. 15, 2005

(54) APPARATUS FOR CONTROLLING HYBRID ELECTRIC VEHICLE

(75) Inventor: Yoshitada Nakao, Aichi (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 91 days.

(21) Appl. No.: 10/011,349

(22) Filed: Dec. 4, 2001

(65) Prior Publication Data

US 2002/0069000 A1 Jun. 6, 2002

(30) Foreign Application Priority Data

Dec. 4, 2000 (JP) ........................................ 2000-369214

(51) Int. Cl.[7] .................... B60L 11/00; G05D 1/00; G06F 17/00; B60K 1/00; B60F 6/00
(52) U.S. Cl. ........................ 701/22; 701/65; 701/208; 701/209; 180/65.1; 180/65.2; 180/65.3; 180/65.4; 320/135
(58) Field of Search .......................... 701/22, 65, 208, 701/209, 53, 98; 180/65.1, 65.2, 65.3, 65.4; 320/135; 318/139

(56) References Cited

U.S. PATENT DOCUMENTS

| | | | | |
|---|---|---|---|---|
| 5,778,326 A | * | 7/1998 | Moroto et al. | ................. 701/22 |
| 5,815,824 A | * | 9/1998 | Saga et al. | ..................... 701/22 |
| 5,832,396 A | * | 11/1998 | Moroto et al. | ................. 701/22 |
| 5,892,346 A | * | 4/1999 | Moroto et al. | ............... 318/587 |
| 5,927,415 A | * | 7/1999 | Ibaraki et al. | .............. 180/65.2 |
| 6,230,496 B1 | * | 5/2001 | Hofmann et al. | ............. 60/706 |
| 6,249,723 B1 | * | 6/2001 | Lutz | ............................. 701/22 |
| 6,314,347 B1 | * | 11/2001 | Kuroda et al. | ................ 701/22 |
| 6,370,451 B2 | * | 4/2002 | Lutz | ............................. 701/22 |
| 6,381,522 B1 | * | 4/2002 | Watanabe et al. | ............. 701/22 |
| 6,452,286 B1 | * | 9/2002 | Kubo et al. | ............... 290/40 C |
| 2001/0044682 A1 | * | 11/2001 | Lutz | ............................. 701/22 |
| 2002/0188387 A1 | * | 12/2002 | Woestman et al. | ............ 701/22 |

FOREIGN PATENT DOCUMENTS

| | | |
|---|---|---|
| JP | 08-322107 | 12/1996 |
| JP | 09-210702 | 8/1997 |
| JP | 11-008909 | 1/1999 |
| JP | 2000-188802 | 7/2000 |

* cited by examiner

Primary Examiner—Thomas G. Black
Assistant Examiner—Brian J. Broadhead
(74) Attorney, Agent, or Firm—Snell & Wilmer, LLP (57) ABSTRACT

An apparatus is provided for controlling a hybrid electric vehicle in which a rechargeable battery is discharged to drive an electric motor to cause the hybrid electric vehicle to travel, and the rechargeable battery is charged with regenerative electric power from the electric motor. The apparatus comprises a car navigation apparatus for outputting route information on a route to a destination of the vehicle including height information, and a control section for controlling charging and discharging of the rechargeable battery. The control section controls high discharge without power assist limit to the vehicle in the route before a downhill travel path of the route based on the route information output from the car navigation apparatus.

14 Claims, 3 Drawing Sheets

APPARATUS FOR CONTROLLING HYBRID ELECTRIC VEHICLE

BACKGROUND OF THE INVENTION

1. Field of the Invention

The present invention relates to an apparatus for controlling a hybrid electric vehicle carrying a rechargeable battery (hereinafter also referred to as a battery) as an auxiliary power source.

2. Description of the Related Art

Recently, so-called hybrid electric vehicles (HEV) are becoming widespread as low-pollution cars for meeting a social demand for reduction in environmental load, improvements in fuel consumption, a reduction in oil resource consumption, etc. Such a HEV comprises an electric motor for driving the vehicle, a rechargeable battery as a power source, an electric generator for charging the battery, and a prime mover for driving the electric generator, such as an engine. In HEVs, electric power from the battery is supplied to the electric motor which in turn drives the HEV, while the battery may be charged by electric power generated by the electric generator driven by the prime mover, or regenerative electric power from the electric motor during deceleration or braking. In HEVs, the battery needs to be maintained in a preferable state of charge so as to satisfy a request for power assist in driving. To this end, the energy of the battery needs to be effectively released (discharged) or absorbed (charged) by controlling the outputs of the electric generator and the electric motor depending on the running state of the vehicle.

A preferable state of charge for a battery in HEVs is such that a sufficient amount of electricity remains in order to meet a demand for electric power in starting or a request for power assist in running. On the other hand, it is important for a battery to retain sufficient space for charge so as to recover energy during deceleration or braking as efficiently as possible. For these reasons, the state of charge (SOC) or the remaining capacity of a battery is controlled by the charging and discharging of the battery so as to be within an intermediate region about a predetermined target value of SOC.

Conventionally, if a battery is continuously charged and discharged while keeping the SOC of the battery within the intermediate region of SOC, a memory effect, such as discharge memory and charge memory, occurs in the battery. The memory effect is responsible for inability to accurately control the SOC of the battery to fall within a predetermined intermediate region.

Specifically, when discharge memory is present during power supply in response to a demand in traveling a HEV, even if the SOC of a battery is within an intermediate region so that the battery can still discharge, the output of the battery is underestimated so that the SOC of the battery is detected to be below the intermediate region. In this case, a battery controller misjudges that the battery cannot respond to a request for power assist in traveling in a sufficient manner. Therefore, power assist is limited so that the battery cannot respond to the power assist request in a sufficient manner. Further, the battery is charged even though the actual SOC of the battery is within an intermediate region. Therefore, it is not currently possible to sufficiently meet social demands, such as an improvement in fuel consumption and a reduction in oil resource consumption.

When charge memory is present during regenerative charge during deceleration or braking of an HEV, even if the SOC of a battery is within an intermediate region so that the battery can be further discharged, the input of the battery is overestimated so that the SOC of the battery is detected to be above the intermediate region. In this case, the battery controller misjudges that it is difficult to recover energy which could be otherwise recovered during deceleration or braking of the HEV, such that the battery cannot respond to a request for energy recovery in traveling since the battery is discharged until the SOC reaches the predetermined intermediate region.

When one or both of discharge memory and charge memory are present, an SOC range in which a battery can be controlled is narrowed, leading to a reduction in so-called "drivability".

Charge memory can be conventionally prevented by full charge or mild overcharge (forced charge) of the battery. In contrast, there has actually been no effective measure to prevent discharge memory. It is known that discharge memory can be eliminated by completely discharging one or more times. This technique has been applied to shavers. However, in a HEV system, when a battery is highly discharged, the battery cannot respond sufficiently to a request for power assist in traveling. Therefore, in HEVs, the SOC of a battery is often intended to be guided to a relatively higher level within a predetermined intermediate region. Thus, it has been difficult to overcome the discharge memory effect.

SUMMARY OF THE INVENTION

According to an aspect of the present invention, an apparatus is provided for controlling a hybrid electric vehicle in which a rechargeable battery is discharged to drive an electric motor to cause the hybrid electric vehicle to travel, and the rechargeable battery is charged with regenerative electric power from the electric motor. The apparatus comprises a car navigation apparatus for outputting route information on a route to a destination of the vehicle including height information, and a control section for controlling charging and discharging of the rechargeable battery. The control section controls high discharge without power assist limit to the vehicle in the route before a downhill travel path of the route based on the route information output from the car navigation apparatus. The term "control high discharge" refers to control of discharge such that the SOC of a battery is caused to be less than a predetermined SOC (an intermediate region of an SOC range described later). The term "high discharge" refers to that the SOC of a battery is caused to be less than the intermediate region. A region below the intermediate region may be defined as a high discharge region.

Therefore, the control section operates in association with the car navigation apparatus so that when it is assumed based on route information from the car navigation apparatus that a rechargeable battery can be charged during a downhill travel path, the rechargeable battery is highly discharged without power assist limit during an uphill travel path before the downhill travel path. Therefore, a request for power assist can be sufficiently satisfied, and discharge memory can be overcome by the high discharge of the rechargeable battery.

In one embodiment of the present invention, the control section specifies a travel path of the route before a downhill travel path based on the route information, such that the rechargeable battery can be highly discharged on the travel path, and controls high discharge on the specified travel path. Further, in one embodiment of the present invention, the control section specifies a downhill travel path based on the route information, such that the rechargeable battery can be brought back from a high discharged state to a predetermined high charge state on the travel path, and controls charge on the specified travel path.

Therefore, the control section can specify a travel path immediately before a downhill travel path based on the route information on which the rechargeable battery can be highly discharged without limitation of power assist. The control section can also specify a downhill travel path based on the route information on which the rechargeable battery can be brought back from a high discharged state to a predetermined high SOC. When such a long downhill travel path having a predetermined length and height difference can be specified on which the rechargeable battery can be brought back to the predetermined high SOC, since the rechargeable battery is brought back to the predetermined high SOC on the long downhill travel path, power assist can be performed, if at all, on a subsequent long uphill travel path. Moreover, when a vehicle is stored at a destination for a long time, the rechargeable battery allows a prime mover to be easily started thereafter.

In one embodiment of the present invention, the rechargeable battery is charged with electric power generated by an electric generator driven by a prime mover, and the control section controls the prime mover to charge the rechargeable battery with regenerative electric power and, in addition, charge the rechargeable battery in the downhill travel path requiring substantially no power assist.

Therefore, a rechargeable battery is charged by an electric generator driven by a prime mover in addition to regenerative charge. Therefore, even on a short downhill travel path, a highly discharged rechargeable battery can be brought back to a predetermined SOC easily and with a short time.

In one embodiment of the present invention, the control section comprises a rechargeable battery control section for outputting a control signal so as to cause a charge state of the rechargeable battery to be in a predetermined charge state, a travel control section for controlling driving of the electric motor based on the control signal, and an electric generation control section for controlling driving of the prime mover based on the control signal.

Therefore, the control section may be easily constructed with a rechargeable battery control section, a travel control section and an electric power generation control section.

In one embodiment of the present invention, the rechargeable battery control section comprises a charge state calculating section for calculating a charge state of a rechargeable battery at predetermined intervals, a charge state upper/lower limit determining section for determining whether the charge state is above an upper limit or below a lower limit of a charge state intermediate region, and a charge and discharge guiding section for guiding charging and discharging of the rechargeable battery so that the charge state is within the charge state intermediate region based on a determination result of the charge state upper/lower limit determining section.

Therefore, the rechargeable battery control section may be easily constructed with an SOC calculating section, an SOC upper/lower limit determining section, and a charge and discharge guiding section.

In one embodiment of the present invention, the rechargeable battery control section comprises a travel assist electric power amount estimating section for estimating a travel assist electric power amount based on the route information from the car navigation apparatus, a regenerative electric power amount estimating section for estimating a regenerative electric power amount based on the route information from the car navigation apparatus, and a high discharge execution determining section for determining the presence or absence of high discharge, based on the travel assist electric power amount and the regenerative electric power amount. The charge and discharge guiding section outputs a control signal for controlling charging and discharging of the rechargeable battery depending on the presence or absence of the high discharge.

Therefore, the control section determines the presence or absence of execution of high discharge depending on a travel assist electric power amount and a regenerative electric power amount obtained based on route information from the car navigation apparatus. The charge and discharge guiding section controls the rechargeable battery in a predetermined manner depending on the presence or absence of execution of high discharge. Therefore, in addition to conventional structure, the rechargeable battery can be highly discharged before a downhill travel path on route to a destination.

In one embodiment of the present invention, the apparatus further comprises an information storing section for storing at least one of a specific location and a time and date. The control section controls charging and discharging of the rechargeable battery so that the rechargeable battery is in a predetermined charge state immediately before the at least one of a specific location and a time and date.

Therefore, if the rechargeable battery comes to a predetermined high SOC immediately before the location of a destination, such as a garage, an airport, and a hotel, or a time and date, a situation in which the rechargeable battery is not used while remaining highly discharged can be avoided, whereby a situation where a prime mover cannot be started can be avoided.

In one embodiment of the present invention, the information storing section is a schedule setting section for setting at least one of a planned location and a time and date for a long-term vehicle storage.

Therefore, a schedule setting section in which a driver stores a long-term vehicle storage schedule is further provided, thereby making it possible to avoid a dead battery.

Thus, the invention described herein makes possible the advantages of providing an apparatus for controlling a HEV in which a request for power assist can be sufficiently satisfied while discharge memory can be overcome.

These and other advantages of the present invention will become apparent to those skilled in the art upon reading and understanding the following detailed description with reference to the accompanying figures.

DESCRIPTION OF THE PREFERRED EMBODIMENTS

Hereinafter, a schematic configuration of an HEV according to an example of the present invention will be described with reference to the accompanying drawings.

Figure 1:
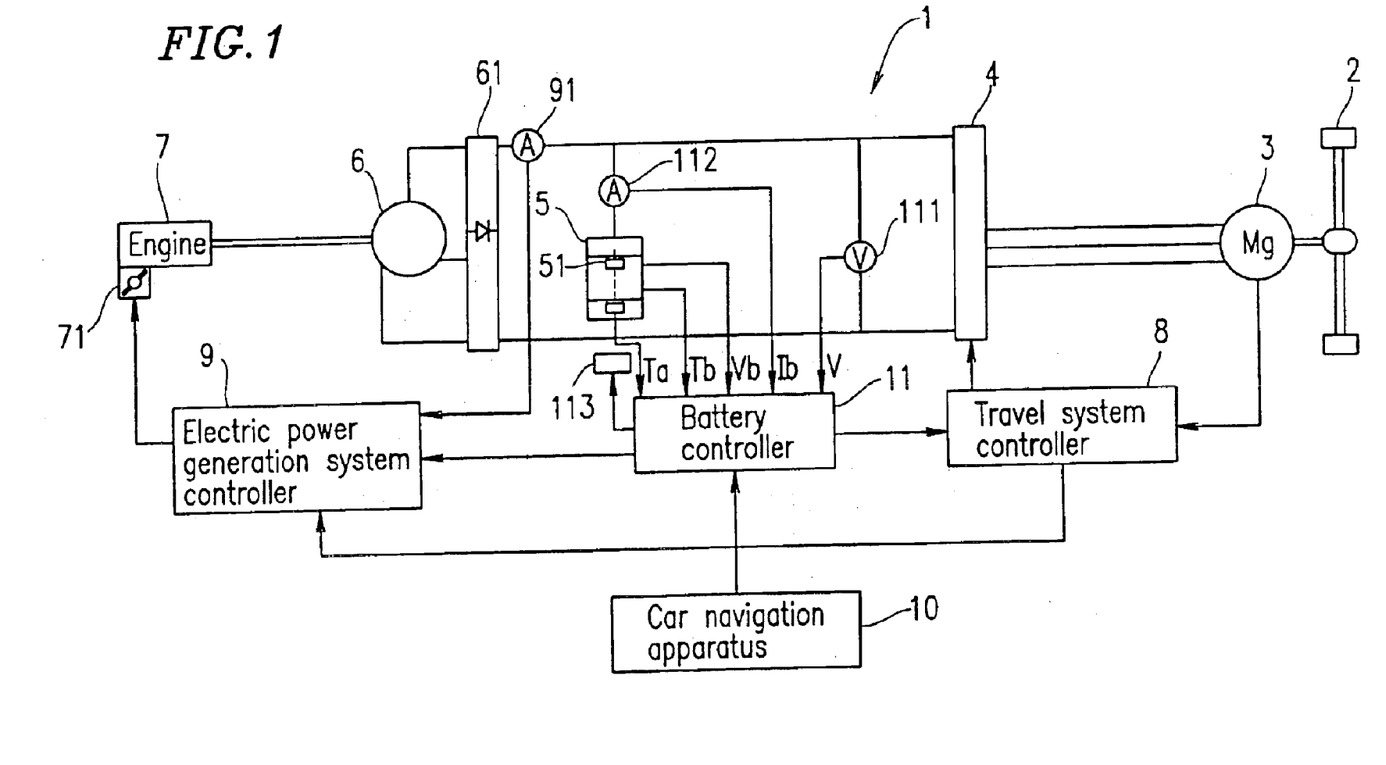
FIG. 1 is a block diagram showing a schematic configuration of a HEV according to an example of the present invention.

FIG. 1 is a block diagram showing a schematic configuration of a HEV according to an example of the present invention. Referring to FIG. 1, a HEV 1 comprises drive wheels 2, an electric motor 3 (hereinafter simply referred to as a motor) as a power source for the drive wheel 2, an inverter 4 for driving the motor 3, a battery 5 for supplying electric power to the inverter 4, a motor generator 6 for battery charge and electric power supply, an engine 7 (prime mover) for driving the motor generator 6, a travel system controller 8 as a travel control section for controlling the driving of the inverter 4, an electric power generation system controller 9 as an electric generation control section for controlling the driving of the engine 7, a car navigation apparatus 10 for outputting various route information, and a battery controller 11 for controlling the travel system controller 8 and the electric power generation system controller 9. The travel system controller 8, the electric power generation system controller 9, and the battery controller 11 constitute a control section for controlling the charging and discharging of the battery 5.

The drive wheels 2 are front wheels and/or rear wheels for driving a vehicle, to which motive power is actually transferred.

The motor 3 receives electric power supply from at least one of the motor generator 6 and the battery 5 during start-up or acceleration to rotate the drive wheel 2 (which is called a drive function), and regenerates electric power to charge the battery 5 during deceleration or braking (which is called an electric generation function).

The inverter 4 inverts a voltage of the battery 5 into a predetermined three-phase high voltage and supplies this to the motor 3, thereby rotating the motor 3.

The battery 5 is a rechargeable battery, which is also called a "primary battery", "main battery", or "battery pack (a plurality of serially-connected battery blocks)", comprising a plurality of battery blocks 51 arranged in series. Each battery block 51 comprises a plurality of rechargeable cells, and outputs a voltage of about DC 20 V, for example. The entire battery blocks outputs a voltage of about DC 400 V at maximum.

The motor generator 6 is an electric generator. Electric power supplied by the motor generator 6 is used to charge the battery 5 or to drive the inverter 4 via a rectifier 61.

The engine 7 is an internal-combustion engine, such as a gasoline or diesel engine, which controls an amount of generated electric power by controlling the rotation of the motor generator 6 depending on an amount of fuel supplied via a throttle 71.

The travel system controller 8 receives a control signal from the battery controller 11. A state of rotation of the motor 3 is also fed back to the travel system controller 8. Based on these pieces of information from the motor 3, the travel system controller 8 controls the drive of the inverter 4, thereby stably controlling the traveling speed of the vehicle via the operation of the motor 3.

The electric power generation system controller 9 receives a control signal from the battery controller 11 and is fed back with a value of generated current measured by a current measurement apparatus 91. Based on these pieces of information from the controller 9, the electric power generation system controller 9 controls a torque of the engine 7 via the throttle 71 controlling an amount of supplied fuel, thereby controlling an amount of generated current by the motor generator 6.

The car navigation apparatus 10 is a system for outputting three-dimensional route information. For example, when a driver selects a destination Q and a route to the destination Q, the car navigation apparatus 10 can output various pieces of three-dimensional route information including at least the height information of uphill and downhill slopes in the route to the destination Q (height difference information). For example, height information includes at least a relative height of at least a portion of such a route. Height may be measured relative to sea level.

The battery controller 11 receives a cooling air temperature Ta as a coolant temperature, a battery temperature Tb, a battery output voltage V detected by a voltage measurement apparatus 111, an output voltage Vb for each battery block 51, and a battery output current Ib detected by a current measurement apparatus 112 to calculated the SOC (in units of %) of the battery 5. Based on the calculated SOC, the battery controller 11 controls the charging and discharging of the battery 5 via the travel system controller 8 and the electric power generation system controller 9, and operates a fan 113 in accordance with the cooling air temperature Ta and the battery temperature Tb so as to cool the battery 5. As a characteristic feature of the present invention, for example, the battery controller 11 operates in the following manner, based on various route information from the car navigation apparatus 10 including the road height information (height difference information). The battery 5 is highly discharged until the beginning of a long downhill slope (travel path) which is present on route to a destination Q. Thereafter, when driving on the downhill slope, the battery 5 is recharged to a predetermined SOC range (a predetermined intermediate region). In this manner, charging and discharging of the battery 5 are controlled via the travel system controller 8 and the electric power generation system controller 9 so that sufficient power assist and a charge amount of the battery 5 can be obtained. Such a long downhill slope is a travel route (or travel path) having a predetermined length and height difference which are sufficient so as to bring the SOC back to a predetermined SOC (a predetermined intermediate range).

Figure 2:
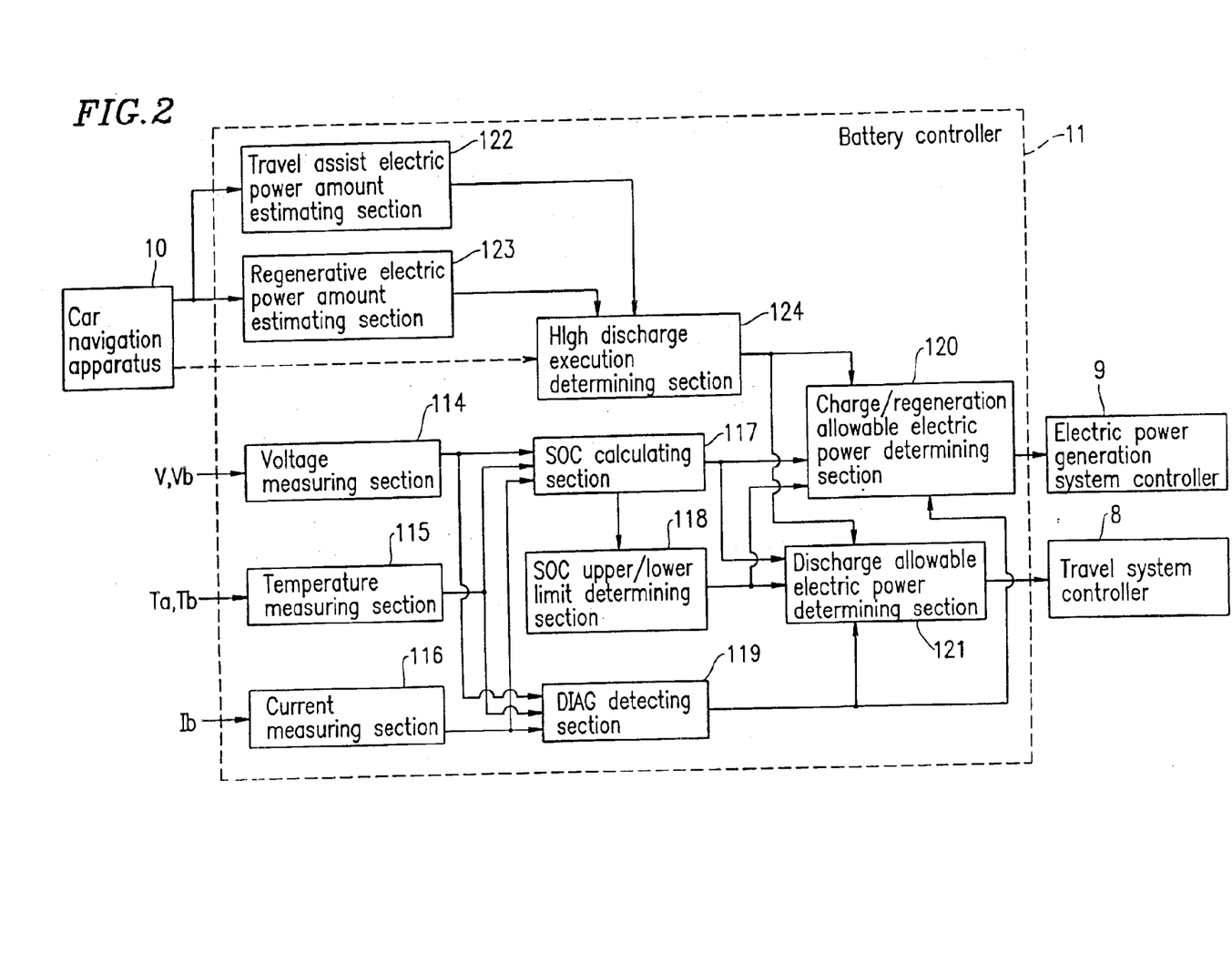
FIG. 2 is a block diagram showing a detailed configuration of a battery controller shown in FIG. 1.

FIG. 2 is a block diagram showing a detailed configuration of the battery controller 11 shown in FIG. 1. Referring to FIG. 2, the battery controller 11 comprises a voltage measuring section 114, a temperature measuring section 115, a current measuring section 116, an SOC calculating section 117, an SOC upper/lower limit determining section 118, a DIAG (diagnosis) detecting section 119, a charge/regeneration allowable electric power determining section 120, and a discharge allowable electric power determining section 121.

The voltage measuring section 114 measures a block voltage Vb for each battery block 51, and measures a voltage V of the entire battery 5 based on values detected by the voltage measurement apparatus 111.

Temperature sensors (not shown) are attached to a plurality of sites, such as the battery blocks 51 and intakes for cooling air of a coolant. The temperature measuring section 115 measures the battery block temperature Tb and the coolant temperature Ta based on a detected value from each temperature sensor for each battery block 51.

The current measuring section 116 measures a battery output current Ib supplied by the battery 5 based on a current value detected by the current measurement apparatus 112 of a magnetic compensation type (or a shunt resistance type).

The SOC calculating section 117 calculates the SOC of each battery block 51 (and the SOC of the entire battery 5) based on voltages measured by the voltage measuring section 114, temperatures measured by the temperature measuring section 115, and currents measured by the current measuring section 116.

The SOC upper/lower limit determining section 118 determines whether the present SOC obtained by the SOC calculating section 117 reaches an SOC upper limit C1 of an SOC range or an SOC lower limit C2 of the SOC range (FIG. 3A), and outputs a result as an SOC upper limit/lower limit determination signal. The SOC upper limit C1 and the SOC lower limit C2 are respectively the upper and lower limits of a predetermined intermediate region C1 to C2 within which the charging and discharging of the battery 5 are controlled. An SOC target value C0 is designed to be an intermediate value of the predetermined intermediate region C1 to C2. The reason for providing such a predetermined intermediate region C1 to C2 is to secure a sufficient SOC of the battery 5 so as to meet a request for sufficient power assist during start or travel of a vehicle while sufficient charge space of the battery 5 is secured so as to recover energy during deceleration or braking as efficiently as possible.

The DIAG detecting section 119 outputs a DIAG detection signal based on a battery block voltage Vb and a battery voltage V from the voltage measuring section 114, a cooling air temperature Ta and a battery temperature Tb of each position from the temperature measuring section 115, a battery output current Ib from the current measuring section 116, and the like.

The charge/regeneration allowable electric power determining section 120 outputs a control signal for determining charge/regeneration allowable electric power to the electric power generation system controller 9, based on the SOC of the battery 5 from the SOC calculating section 117, an SOC upper limit/lower limit determination signal from the SOC upper/lower limit determining section 118, and a DIAG detection signal from the DIAG detecting section 119, so as to control charge of the battery 5.

The discharge allowable electric power determining section 121 outputs a control signal (electric power determination control signal ) for determining discharge allowable electric power to the electric power generation system controller 8, based on the SOC of the battery 5 from the SOC calculating section 117, an SOC upper limit/lower limit determination signal from the SOC upper/lower limit determining section 118, and a DIAG detection signal from the DIAG detecting section 119, so as to control discharge of the battery 5.

The charge/regeneration allowable electric power determining section 120 and the discharge allowable electric power determining section 121 constitute a charge and discharge guiding section. The charge and discharge guiding section guides charge and discharge of the battery 5 in response to a power assist request in such a manner that the calculated SOC of the battery 5 falls within the predetermined intermediate region.

The battery controller 11 comprises a travel assist electric power amount estimating section 122, a regenerative electric power amount estimating section 123, and a high discharge execution determining section 124 which are associated with the car navigation apparatus 10.

Figure 3A:
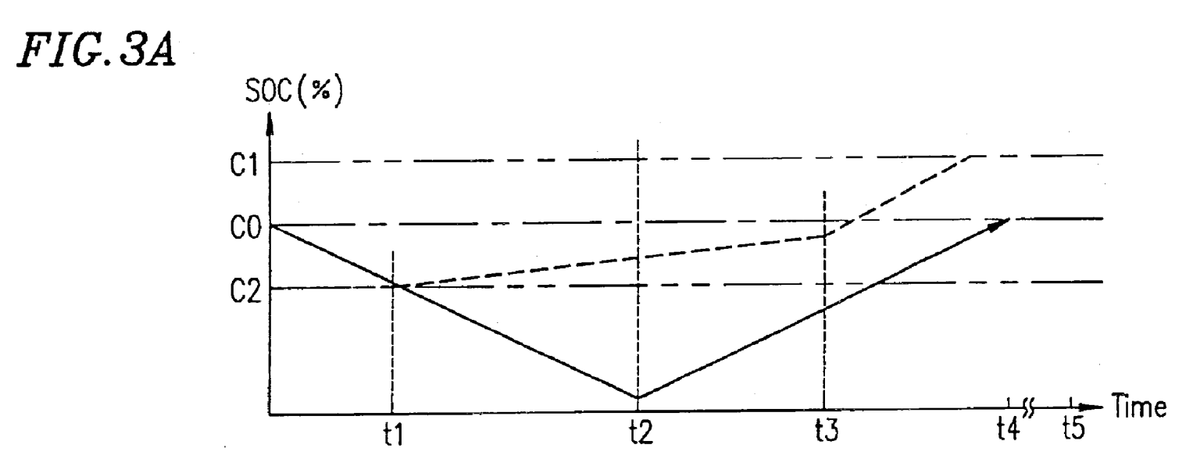
FIG. 3A is a diagram for explaining the control of SOC by the battery controller shown in FIG. 2.
Figure 3B:
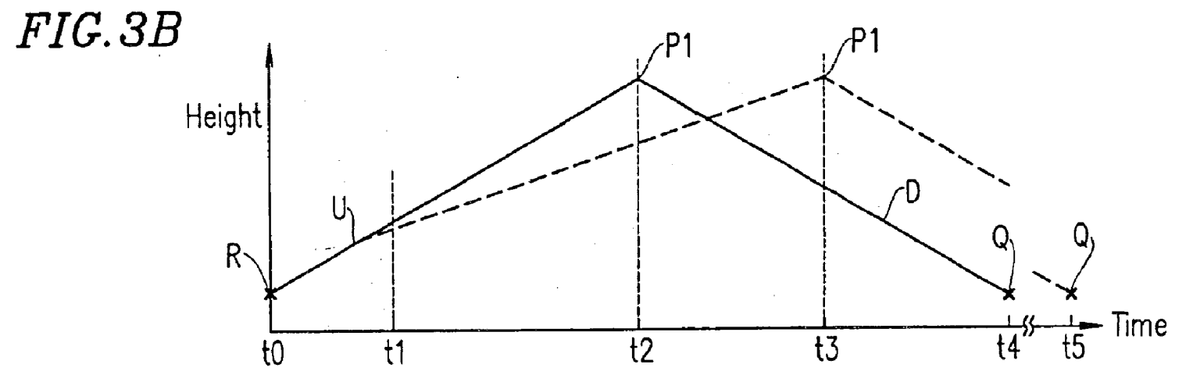
FIG. 3B are diagrams showing examples of height information corresponding to FIG. 3A.

The travel assist electric power amount estimating section 122 receives, from the car navigation apparatus 10, route information (travel information) including the height information of an uphill slope U and a downhill slope D and distance information of a travel route up to a destination Q designated by a driver, for example, as shown in FIG. 3B, and successively calculates and detects a travel assist electric power amount for each travel route portion corresponding to uphill slope U information (height difference information) in a selected predetermined travel route (predetermined travel path), which is output as an estimated travel assist electric power amount as data.

The regenerative electric power amount estimating section 123 receives, from the car navigation apparatus 10, route information (travel information) including the height information of an uphill slope U and a downhill slope D and distance information of a travel route to a destination Q and successively calculates and detects a regenerative electric power amount for each travel route portion corresponding to downhill slope D information (height difference information) in a selected predetermined travel route, which is output as an estimated regenerative electric power amount as data.

The high discharge execution determining section 124 receives output data corresponding to an estimated travel assist electric power amount and an estimated regenerative electric power amount for each travel route portion, and determines whether or not the SOC of the battery 5 can be brought back to the predetermined intermediate region C1 to C2 (or the SOC target value C0) by regenerative charge on the immediately next long downhill slope D (downhill travel path) even if the battery 5 is highly discharged.

Further, the high discharge execution determining section 124 receives output data corresponding to an estimated travel assist electric power amount and an estimated regenerative electric power amount for each travel route portion, and determines whether or not the battery 5 can be highly discharged on the uphill slope U (travel path) immediately before the long downhill slope D.

Based on at least one of a result of determination of whether the SOC of the battery 5 can be brought back to the predetermined SOC on the long downhill slope D and a result of determination of whether the SOC of the battery 5 can be highly discharged on the uphill slope U, a high discharge execution determination signal representing a high discharge mode and a normal mode is output to the charge/regeneration allowable electric power determining section 120 and the discharge allowable electric power determining section 121. In this example, the high discharge execution determination signal is made active when the SOC of the battery 5 can be brought back to a predetermined SOC (intermediate region C1 to C2) on the long downhill slope D and when the battery 5 can be highly discharged on the uphill slope U.

Hereinafter, an operation of the above-described configuration will be specifically described.

FIG. 3A is a diagram showing an example of how the SOC of the battery 5 is controlled by the battery controller 11 shown in FIG. 2. FIG. 3B is a diagram showing an example of height information corresponding to FIG. 3A. For the sake of clarification, as shown in FIG. 3B, a HEV 1 according to the present invention climbs from a current location R up the uphill slope U, crosses a summit P1, and descends the downhill slope D toward the destination Q.

A driver of the HEV 1 switches ON the car navigation apparatus 10 to confirm the current location R, inputs the destination Q, and selects a travel route from the current location R to the destination Q as shown in FIG. 3B. The car navigation apparatus 10 outputs height information (height difference information) and distance information corresponding to the uphill slope U and the downhill slope D in the travel route to the travel assist electric power amount estimating section 122 and the regenerative electric power amount estimating section 123. The travel assist electric power amount estimating section 122 calculates a travel assist electric power amount based on the height difference and distance information corresponding to the uphill slope U in the travel route. The regenerative electric power amount estimating section 123 calculates a regenerative electric power amount based on the height difference and distance information corresponding to the downhill slope D in the travel route.

Thereafter, the high discharge execution determining section 124 receives an estimated travel assist electric power amount corresponding to the uphill slope U in the travel route and an estimated regenerative electric power amount corresponding to the downhill slope D. The high discharge execution determining section 124 determines whether or not the SOC of the battery 5 can be brought back to the predetermined intermediate region C1 to C2 (or the SOC target value C0) by regenerative charge on the immediately next downhill slope D (downhill travel path) based on the estimated travel assist electric power amount and the estimated regenerative electric power amount, even if the battery 5 is highly discharged. Meanwhile, the high discharge execution determining section 124 determines whether or not the battery 5 can be highly discharged on the uphill slope U (travel path) immediately before the long downhill slope D.

When the high discharge execution determining section 124 determines that the battery 5 can be highly discharged on the uphill slope U (travel path) immediately before the long downhill slope D and that after the high discharge, the SOC of the battery 5 can be brought back to the predetermined intermediate region C1 to C2 (or the SOC target value C0), the high discharge execution determination signal is made to be in the active state, which causes the charge/regeneration allowable electric power determining section 120 and the discharge allowable electric power determining section 121 to be in the high discharge mode.

When the high discharge execution determining section 124 determines that the battery 5 cannot be highly discharged on the uphill slope U (travel path) immediately before the long downhill slope D and/or that after the high discharge, the SOC of the battery 5 cannot be brought back to the predetermined intermediate region C1 to C2 (or the SOC target value C0), the high discharge execution determination signal is made to be in the negative state, which causes the charge/regeneration allowable electric power determining section 120 and the discharge allowable electric power determining section 121 to be in the normal mode.

In the high discharge mode, on the uphill slope U 21 indicated by a dashed line in FIG. 3B, as indicated by a dashed line in FIG. 3A, even when the SOC of the battery 5 calculated by the SOC calculating section 117 reaches the lower limit C2 at time t1 due to repetition of power assist during a present travel, the discharge allowable electric power determining section 121 does not put a limit on the use of power assist and highly discharges the battery 5 during a time period of t1 to t2 (summit P1) to the lower limit C2 or less. In this case, as is different from conventional techniques, the charge/regeneration allowable electric power determining section 120 does not perform charge control by utilizing a part of an output of the engine 7 (indicated by a dashed line in a time period t1 to t3 in FIG. 3A). Thus, in accordance with a high discharge executing instruction (a high discharge execution determination signal in an active state), the discharge allowable electric power determining section 121 does not put a limit on power assist, so that the drivability of the HEV 1 is good, and the battery 5 is highly discharged so that discharge memory can be suppressed or eliminated.

Further, the SOC of the battery 5 output from the SOC calculating section 117 is decreased to a high discharged state at the summit PI and thereafter, the HEV 1 descends on the downhill slope D and performs regenerative charge the battery 5 on the downhill slope D until the destination Q. Therefore, the SOC of the battery 5 output from the SOC calculating section 117 is gradually improved from a high discharged state toward the SOC target value Co. The SOC of the battery 5 is eventually brought back to the predetermined intermediate region C1 to C2 and further at time t4, the HEV 1 reaches the destination Q, when the SOC of the battery 5 comes into a high charge state (i.e., the SOC target value C0).

Further, when the high discharge execution determination signal is in the negative state, the charge/regeneration allowable electric power determining section 120 and the discharge allowable electric power determining section 121 are in the normal mode, similar to conventional SOC control techniques. When the SOC of the battery 5 during present travel output from the SOC calculating section 117 is gradually decreased due to power assist and reaches the lower limit C2 at time t1, the battery 5 is charged by the motor generator 6 via the charge/regeneration allowable electric power determining section 120, similar to conventional techniques. In this case, the discharge allowable electric power determining section 121 puts a limit on travel power assist and the battery 5 is charged by supplying electric power from the motor generator 6. This situation is indicated by a dashed line in an uphill time period t0 to t3 in FIGS. 3A and 3B. Specifically, a time required for the HEV 1 to reach the summit P1 is the uphill time period t0 to t2 in the high discharge mode which is shorter than the uphill time period t0 to t3 in the normal mode, and the drivability of the HEV 1 is lowered, since travel power assist is limited. The battery 5 is charged by regeneration up to the upper limit C1 (or the SOC target value C0) on the downhill slope D from time t3 at which the HEV 1 crosses the summit P1. In this case, whereas in the high discharge mode the HEV 1 reaches the destination Q at time t4, in the normal mode the arrival of the HEV 1 is delayed to time t5 due to the limitation of power assist.

According to the above-described example, the battery controller 11 operates in association with the car navigation apparatus 10. Specifically, the battery 5 is highly discharged by the time that the HEV 1 reaches the long downhill slope D in a travel route to the destination Q and thereafter, the battery 5 is subjected to regenerative charge on the long downhill slope D so that the SOC of the battery 5 is brought back to the predetermined intermediate region C1 to C2. Such charge and discharge control can sufficiently meet a power assist request, and can prevent discharge memory which is conventionally difficult to remove. Therefore, it is possible to prevent a situation that the apparent capacity of the battery 5 is lowered due to discharge memory and the usage range of the battery 5 is narrowed. Further, when the HEV 1 returns to a storage location (e.g., a garage) from a destination or vice versa, the SOC of the battery 5 comes to the predetermined intermediate region C1 to C2. Therefore, it is possible to prevent a situation where if the battery 5 is not used for a long time with the SOC of the highly discharged battery 5 remaining as it is, leading to overdischarge, the motor 3 cannot be started in the future.

Although it is not specified in the above-described example, the battery controller 11 may operate in association with the car navigation apparatus 10 in the following manner. An inquiry as to the presence or absence of a plan for long-term storage of a vehicle is made. For example, long-term storage refers to a situation such that the SOC of a rechargeable battery comes to less than a predetermine SOC after the storage. When a plan for long-term storage of the vehicle is present, if a schedule confirming means (a schedule setting means) with which a driver designs a schedule is provided, the battery 5 is charged by regenerative charge and/or driving of the engine 7 when the HEV 1 is located within a predetermined area in the vicinity of the long-term vehicle storage location (e.g., a garage, an airport, etc.) or before a predetermined time and date stored in an information storing means in the schedule confirming means, whereby the SOC of the battery 5 can be brought back to the predetermined intermediate region C1 to C2 (or the SOC target value C0) within which the SOC of the battery 5 is high. Therefore, it is possible to prevent a situation where if the battery 5 is not used for a long time with the SOC of the highly discharged battery 5 remaining as it is, the motor 3 cannot be started in the future. Similarly, a specific site, such as a garage, an airport, etc., may be previously stored in an information storing means, whereby when the HEV 1 comes near the specific site, the battery 5 can be automatically brought back to a high SOC and the motor 3 can be easily started after the long-term storage.

In the above-described example, the battery controller 11 controls the charging and discharging of the battery 5 via the travel system controller 8 and the electric power generation system controller 9 based on the SOC of each battery block 51 calculated by the SOC calculating section 117 and the SOC of the entire battery 5. The present invention is not limited to this. The battery controller 11 may control charging and discharging of the battery 5 via the travel system controller 8 and the electric power generation system controller 9 based on either the SOC of each battery block 51 calculated by the SOC calculating section 117 or the SOC of the entire battery 5.

In the above-described example, the battery 5 is highly discharged on the uphill slope U before the long downhill slope D on a one-way travel route to the destination Q and thereafter, the battery 5 is subjected to regenerative charge on the long downhill slope D, whereby the SOC of the battery 5 can be brought back to the predetermined intermediate region C1 to C2, or particularly the SOC target value C0. If the battery 5 is charged with electric power supplied by the motor generator 6 in addition to regenerative charge, the SOC of the highly discharged battery 5 can be brought back to the predetermined intermediate region C1 to C2, or particularly to the SOC target value C0 at a higher rate and in a easier manner than conventionally possible. In this case, the high discharge execution determining section 124 may determine that a short downhill slope, whose regenerative charge is insufficient to bring the SOC of the highly discharged battery 5 back to the predetermined intermediate region C1 to C2 (or the SOC target value C0), enables the SOC of the battery 5 to be brought back to the predetermined intermediate region C1 to C2 (or the SOC target value C0) if the battery 5 is additionally charged by electric power supplied from the motor generator 6.

In the above-described example, the charge control after high discharge in a one-way travel route to the destination Q is described. The high discharge control and the subsequent charge control of the present invention can be applied to a round-trip travel route where a start point R is a destination Q upon return. Specifically, a round-trip travel route may be considered as a two-times repetition of the one-way travel route of the present invention. Alternatively, the high discharge control and the subsequent charge control of the present invention can be applied to a return-trip travel route after an outward trip travel route.

In the above-described example, the travel route has the uphill slope U and the downhill slope D in transit to the destination Q. In such a simple travel route, the battery 5 is highly discharged and is thereafter subjected to regenerative charge. Alternatively, a travel route may have a number of uphill slopes and downhill slopes to a destination. The present invention can be applied to such a complicated travel route, whereby power assist can be satisfactorily performed and discharge memory can be eliminated. In this case, for example, a long downhill slope (including contiguous downhill slopes) is detected in a travel route, the battery 5 is highly discharged until the HEV 1 encounters the long downhill slope, and the battery 5 is subjected to regenerative charge on the long downhill slope. Further, if a travel route has a number of uphill slopes and downhill slopes to a destination, a plurality of long downhill slopes are detected, the battery 5 is highly discharged until the HEV 1 encounters each downhill slope, and is subjected to regenerative charge on the downhill slope.

Although it is not described in the above-described example, the high discharge execution determining section 124 may operate in the following manner. The high discharge execution determining section 124 specifies a long downhill slope on which the SOC of the battery 5 can be brought back to the SOC target value CO in the predetermined intermediate region C1 to C2 even when the high discharge execution determining section 124 receives output data corresponding to an estimated travel assist electric power amount or an estimated regenerative electric power amount for each small route and the battery 5 is highly discharged. Meanwhile, until the high discharge execution determining section 124 receives information on a current travel location from the car navigation apparatus 10, and detects that the current travel location is close to the specified long downhill slope in a predetermined travel route, the battery 5 is highly discharged via the discharge allowable electric power determining section 121. Thereafter, the battery 5 is subjected to regenerative charge on the detected downhill slope via the charge/regeneration allowable electric power determining section 120. In this manner, the high discharge execution determining section 124 may output high discharge execution determination signals to the charge/regeneration allowable electric power determining section 120 and the discharge allowable electric power determining section 121. In this case, as indicated by a dashed line in FIG. 2, the car navigation apparatus 10 needs to be connected to the high discharge execution determining section 124 via a signal line.

According to the present invention, a control section operates in association with a car navigation apparatus so that when it is assumed based on route information from the car navigation apparatus that a rechargeable battery can be charged during a downhill travel path, the rechargeable battery is highly discharged without power assist limit during an uphill travel path immediately before the downhill travel path. Therefore, a request for power assist can be sufficiently satisfied, and discharge memory can be overcome by the high discharge of the rechargeable battery.

The control section can specify a travel path immediately before a downhill travel path based on the route information on which the rechargeable battery can be highly discharged without limitation of power assist. The control section can also specify a downhill travel path based on the route information on which the rechargeable battery can be brought back from a high discharged state to a predetermined high SOC. When such a long downhill travel path having a predetermined length and height difference can be specified on which the rechargeable battery can be brought back to the predetermined high SOC, since the rechargeable battery is brought back to the predetermined high SOC on the long downhill travel path, power assist can be performed, if at all, on a subsequent long uphill travel path. Moreover, when a vehicle is stored at a destination for a long time, the rechargeable battery allows a prime mover to be easily started thereafter.

A rechargeable battery is charged by an electric generator driven by a prime mover in addition to regenerative charge. Therefore, even on a short downhill travel path, a highly discharged rechargeable battery can be brought back to a predetermined SOC easily and with a short time.

The control section may comprise a rechargeable battery control section, a travel control section and an electric power generation control section.

The rechargeable battery control section may comprise an SOC calculating section, an SOC upper/lower limit determining section, and a charge and discharge guiding section.

The control section may determine the presence or absence of execution of high discharge depending on a travel assist electric power amount and a regenerative electric power amount obtained based on route information from the car navigation apparatus. The charge and discharge guiding section controls the rechargeable battery in a predetermined manner depending on the presence or absence of execution of high discharge. Therefore, in addition to conventional structure, the rechargeable battery can be highly discharged before a downhill travel path on route to a destination.

If the rechargeable battery comes to a predetermined high SOC immediately before the location of a destination, such as a garage, an airport, and a hotel, or a time and date, a situation in which the rechargeable battery is not used while remaining highly discharged can be avoided, whereby a situation where a prime mover cannot be started can be avoided.

The control section may further comprise a schedule setting section in which a driver stores a long-term vehicle storage schedule, thereby making it possible to avoid a dead battery.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An apparatus for controlling a hybrid electric vehicle wherein a rechargeable battery is discharged to drive an electric motor to cause the hybrid electric vehicle to travel, the rechargeable battery is charged with regenerative electric power from the electric motor, the apparatus comprising:
a car navigation apparatus for outputting route information on a route to a destination of the vehicle including height information; and
a control section for controlling charging and discharging of the rechargeable battery,
wherein the control section has a full discharge mode for substantially fully discharging the rechargeable battery without power assist limit to the vehicle in the route before a downhill travel path of the route based on the route information output from the car navigation apparatus.

2. An apparatus according to claim 1, wherein the control section specifies a travel path of the route before a downhill travel path based on the route information, such that the rechargeable battery can be highly discharged on the travel path, and controls high discharge on the specified travel path.

3. An apparatus according to claim 2, wherein the control section specifies a downhill travel path based on the route information, such that the rechargeable battery can be brought back from a high discharged state to a predetermined high charge state on the travel path, and controls charge on the specified travel path.

4. An apparatus according to claim 1, wherein the control section specifies a downhill travel path based on the route information, such that the rechargeable battery can be brought back from a high discharged state to a predetermined high charge state on the travel path, and controls charge on the specified travel path.

5. An apparatus according to claim 1, wherein the rechargeable battery is charged with electric power generated by an electric generator driven by a prime mover, and the control section controls the prime mover to charge the rechargeable battery with regenerative electric power and, in addition, charge the rechargeable battery in the downhill travel path requiring substantially no power assist.

6. An apparatus according to claim 5, wherein the control section comprises:
a rechargeable battery control section for outputting a control signal so as to cause a charge state of the rechargeable battery to be in a predetermined charge state;
a travel control section for controlling driving of the electric motor based on the control signal; and
an electric generation control section for controlling driving of the prime mover based on the control signal.

7. An apparatus according to claim 6, wherein the rechargeable battery control section comprises:
a charge state calculating section for calculating a charge state of a rechargeable battery at predetermined intervals;
a charge state limit determining section for determining whether the charge state is above an upper limit or below a lower limit of a charge state intermediate region; and
a charge and discharge guiding section for guiding charging and discharging of the rechargeable battery so that the charge state is within the charge state intermediate region based on a determination result of the charge state limit determining section.

8. An apparatus according to claim 7, wherein the rechargeable battery control section comprises:
a travel assist electric power amount estimating section for estimating a travel assist electric power amount based on the route information from the car navigation apparatus;
a regenerative electric power amount estimating section for estimating a regenerative electric power amount based on the route information from the car navigation apparatus; and
a high discharge execution determining section for determining the presence or absence of high discharge, based on the travel assist electric power amount and the regenerative electric power amount,
wherein the charge and discharge guiding section outputs a control signal for controlling charging and discharging of the rechargeable battery depending on the presence or absence of the high discharge.

9. An apparatus according to claim 8, further comprising an information storing section for storing at least one of a specific location and a time and date, wherein the control section controls charging and discharging of the rechargeable battery so that the rechargeable battery is in a predetermined charge state immediately before the at least one of a specific location and a time and date.

10. An apparatus according to claim 9, wherein the information storing section is a schedule setting section for setting at least one of a planned location and a time and date for a long-term vehicle storage.

11. An apparatus according to claim 5, further comprising an information storing section for storing at least one of a specific location and a time and date, wherein the control section controls charging and discharging of the rechargeable battery so that the rechargeable battery is in a predetermined charge state immediately before the at least one of a specific location and a time and date.

12. An apparatus according to claim 11, wherein the information storing section is a schedule setting section for setting at least one of a planned location and a time and date for a long-term vehicle storage.

13. An apparatus according to claim 1, further comprising an information storing section for storing at least one of a specific location and a time and date, wherein the control section controls charging and discharging of the rechargeable battery so that the rechargeable battery is in a predetermined charge state immediately before the at least one of a specific location and a time and date.

14. An apparatus according to claim 13, wherein the information storing section is a schedule setting section for setting at least one of a planned location and a time and date for a long-term vehicle storage.

* * * * *